United States Patent [19]
Weng

[11] Patent Number: 5,931,326
[45] Date of Patent: Aug. 3, 1999

[54] CONTAINER ASSEMBLY

[76] Inventor: Stanley Weng, No. 291-16, Peitun Rd., Taichung, Taiwan

[21] Appl. No.: 09/035,733

[22] Filed: Mar. 5, 1998

[51] Int. Cl.⁶ ...................................................... B65D 6/22
[52] U.S. Cl. ........................................ 220/4.33; 220/4.28
[58] Field of Search ................................ 220/4.28, 4.32, 220/4.29, 4.33, 4.34

[56] References Cited

U.S. PATENT DOCUMENTS

| | | | |
|---|---|---|---|
| 3,138,398 | 6/1964 | Silverman | 220/4.28 |
| 4,194,642 | 3/1980 | Glavan | 220/4.28 |
| 4,561,554 | 12/1985 | Swincicki | 220/4.28 |
| 4,649,667 | 3/1987 | Kitograd | 220/4.28 |
| 4,782,972 | 11/1988 | Wenkman et al. | 220/4.28 |
| 5,413,236 | 5/1995 | Kenevan | 220/4.28 |

*Primary Examiner*—Joseph M. Moy
*Attorney, Agent, or Firm*—Patterson & Keough, P.A.

[57] ABSTRACT

A container assembly includes a bottom member, two end members and two side members so as to form the container which defines an open top. There are holes defined in and stubs extending from said members so as to connect said members together. At least one connecting member connects the two end members together so that said container is easily assembled and has a rigid construction.

6 Claims, 9 Drawing Sheets

FIG. 9

CONTAINER ASSEMBLY

BACKGROUND OF THE INVENTION

1. Field of the Invention

The present invention relates to a container and, more particularly, to a container which includes more than two members, each one of which has holes defined therein and some of the members have stubs extending therefrom so as to be inserted into the holes to form the container.

2. Brief Description of the Prior Art

Most containers are made of wooden boards which are fixedly connected with each other by nailing or glue. These types of containers occupy a certain space and are not suitable to be dismantled frequently so that the owners have to prepare a large warehouse to store the containers. A high transportation cost is incurred when the containers are sent to the sellers or the like. Furthermore, the containers are troublesome for the owners if one or two walls thereof need to be replaced.

The present invention intends to provide an improved container assembly which is formed by members, some of which have holes defined therein and some of which have stubs extending therefrom so as to be inserted into the holes whereby the container can be constructed.

Therefore, the container in accordance with the present invention can be assembled or dismantled easily without any damage occurring to an outer surface of the members of the container.

SUMMARY OF THE INVENTION

The present invention provides a container assembly which includes a bottom member having two first holes defined in one of two ends thereof and two second holes defined in the other end thereof. A first end member has two third holes defined in a lower end thereof and two fourth holes defined in an upper end thereof. A second end member has two fifth holes defined in a lower end thereof and two sixth holes defined in an upper end thereof. Two first stubs extend laterally from said lower end of said first end member so as to be inserted into said first holes of said bottom member. Two second stubs extend laterally from said upper end of said first end member. Two third stubs extend laterally from said lower end of said second end member so as to be inserted into said second holes of said bottom member. Two fourth stubs extend laterally from said upper end of said second member.

A first side member has two fifth stubs extending upwardly from a lower end thereof so as to be respectively inserted into one of said two third holes of said first end member and one of said two fifth holes of said second end member. Two seventh holes are respectively and longitudinally defined in an upper end of said first side member so as to respectively receive one of said two second stubs of said first end member and one of said two fourth stubs of said second end member. A second side member has two sixth stubs extending upwardly from a lower end thereof so as to be respectively inserted into the other one of said two third holes of said first end member and the other one of said two fifth holes of said second end member. Two eighth holes are respectively and longitudinally defined in an upper end of said second side member so as to respectively receive the other one of said two second stubs of said first end member and the other one of said two fourth stubs of said second end member.

Two connecting members each have two connecting stubs extending transversely therefrom so that said two connecting stubs are inserted into said sixth holes of said second end member. The two connecting stubs are inserted into said fourth holes of said first end member.

It is an object of the present invention to provide a container including five members and which is easily to be manufactured and assembled.

It is another object of the present invention to provide a container which can be dismantled so as to reduce space occupied when being transported from a manufacturer.

Other objects, advantages, and novel features of the invention will become more apparent from the following detailed description when taken in conjunction with the accompanying drawings.

DETAILED DESCRIPTION OF THE PREFERRED EMBODIMENTS

Referring to the drawings and initially to FIGS. 1 through 5, a container assembly in accordance with the present invention generally includes a bottom member 14 which has two first holes 36 defined in one of two ends thereof and two second holes 37 defined in the other end thereof.

A first end member 10 has two third holes 30 defined in a lower end thereof and two fourth holes 31 defined in an upper end thereof. A second end member 13 has two fifth holes 32 defined in a lower end thereof and two sixth holes 33 defined in an upper end thereof. Two first stubs 20 extend laterally from said lower end of said first end member 10 so as to be inserted into said first holes 36 of said bottom member 14. Two second stubs 21 extend laterally from said upper end of said first end member 10. Two third stubs 22 extend laterally from said lower end of said second end member 13 so as to be inserted into said second holes 37 of said bottom member 14. Two fourth stubs 23 extend laterally from said upper end of said second member 10.

A first side member 11 has two fifth stubs 24 extending upwardly from a lower end thereof so as to be respectively inserted into one of said two third holes 30 of said first end member 10 and one of said two fifth holes 32 of said second end member 13. Two seventh holes 34 are respectively and longitudinally defined in an upper end of said first side member 11 so as to respectively receive one of said two second stubs 21 of said first end member 10 and one of said two fourth stubs 23 of said second end member 13. A second side member 12 has two sixth stubs 25 extending upwardly from a lower end thereof so as to be respectively inserted into the other one of said two third holes 30 of said first end member 10 and the other one of said two fifth holes 32 of said second end member 13. Two eighth holes 35 are respectively and longitudinally defined in an upper end of said second side member 12 so as to respectively receive the other one of said two second stubs 21 of said first end member 10 and the other one of said two fourth stubs 23 of said second end member 13.

Two connecting members 40, 41 each have two connecting stubs 42, 43 extending transversely therefrom so that said two connecting stubs 42 are inserted into said sixth holes 33 of said second end member 13 and said two connecting stubs 43 are inserted into said fourth holes 31 of said first end member 10.

Figure 1:
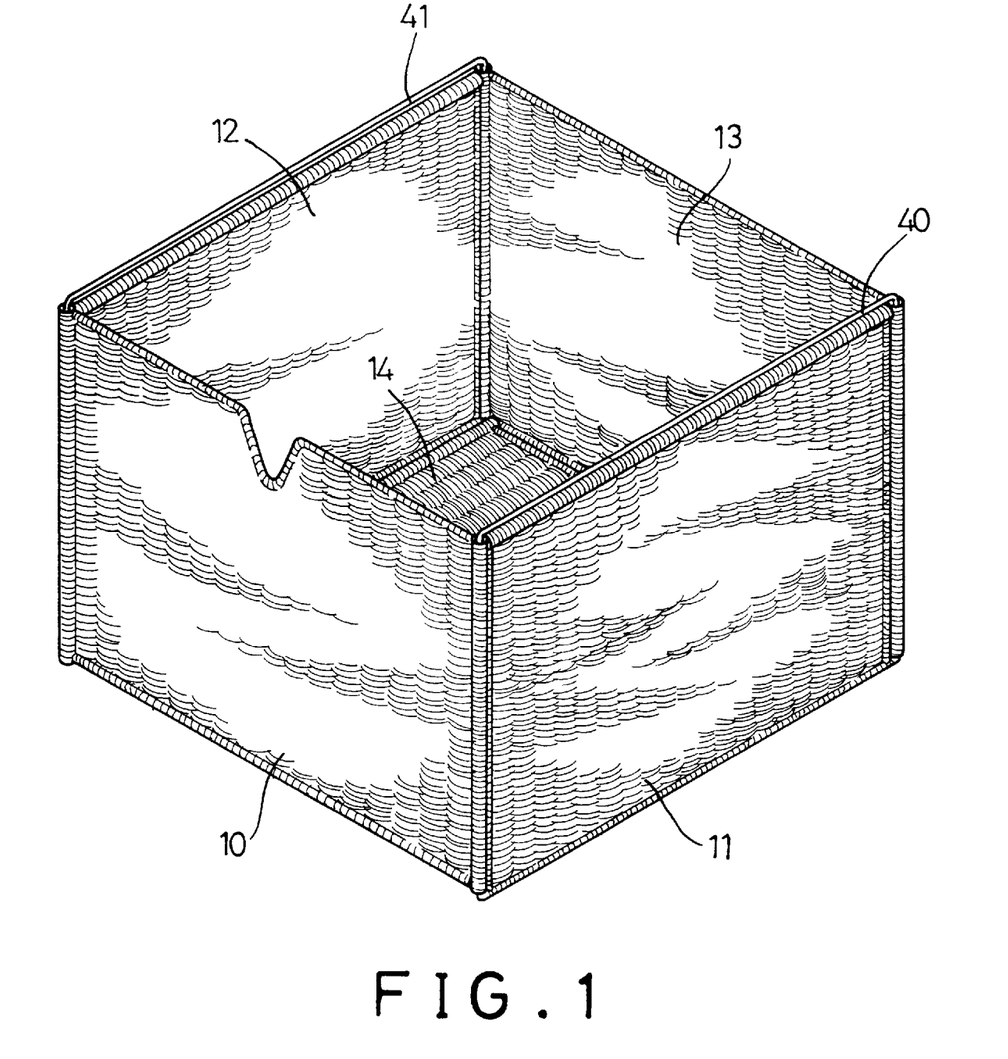
FIG. 1 is a perspective view of a container assembly in accordance with the present invention.
Figure 2:
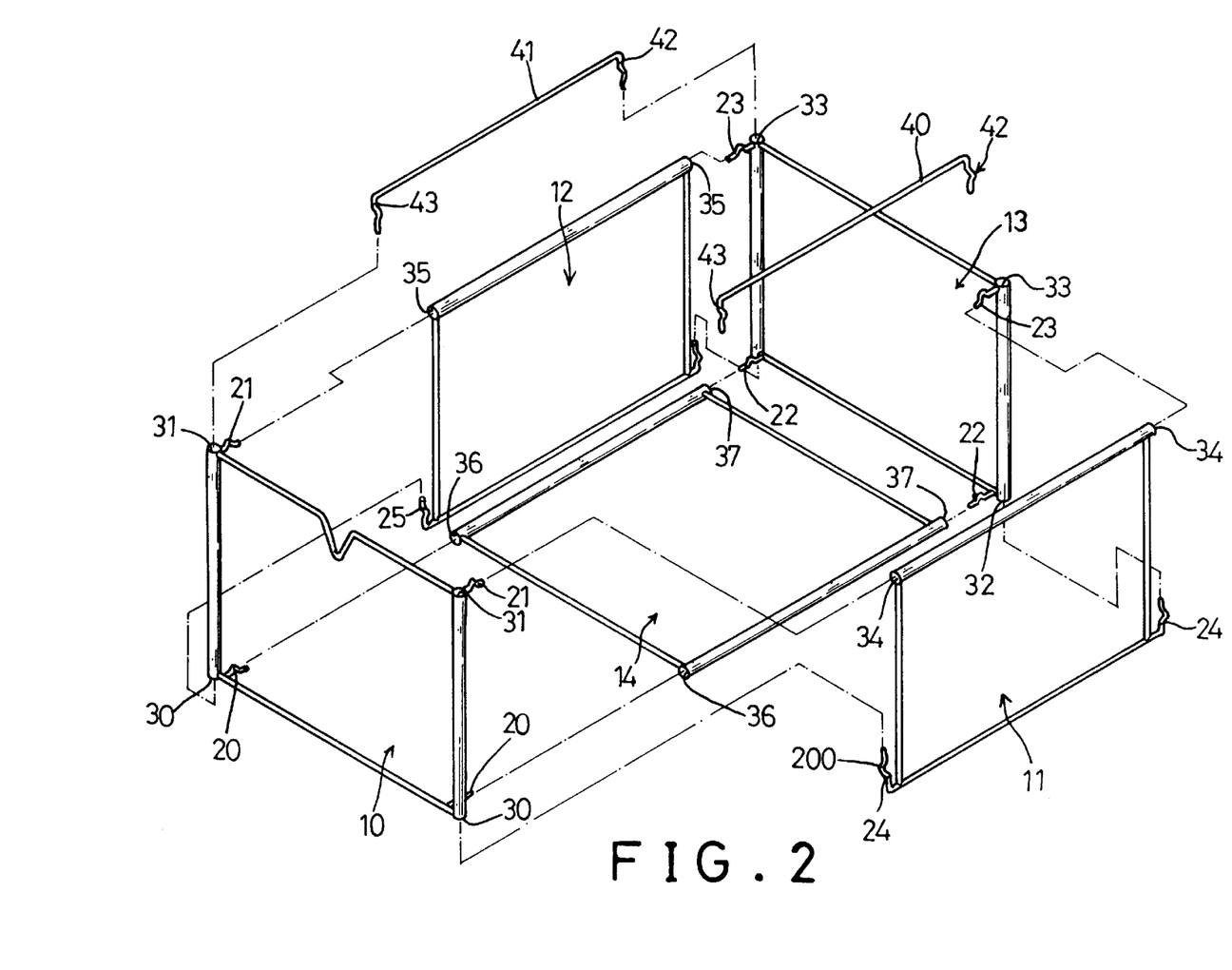
FIG. 2 is an exploded view of the container assembly in accordance with the present invention.
Figure 3:
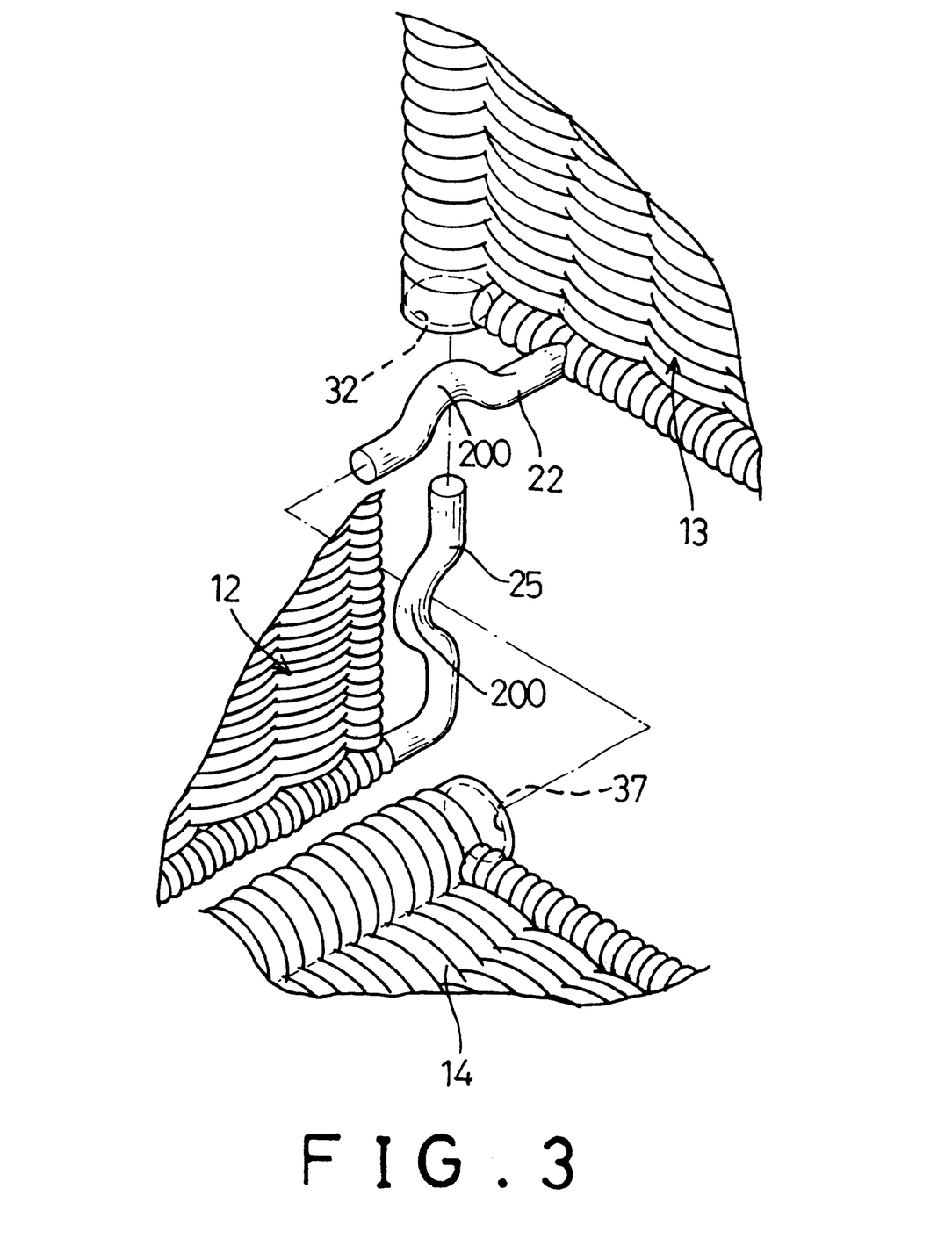
FIG. 3 is an exploded view of two members of the container assembly and shows stubs and holes which receive the stubs.
Figure 4:
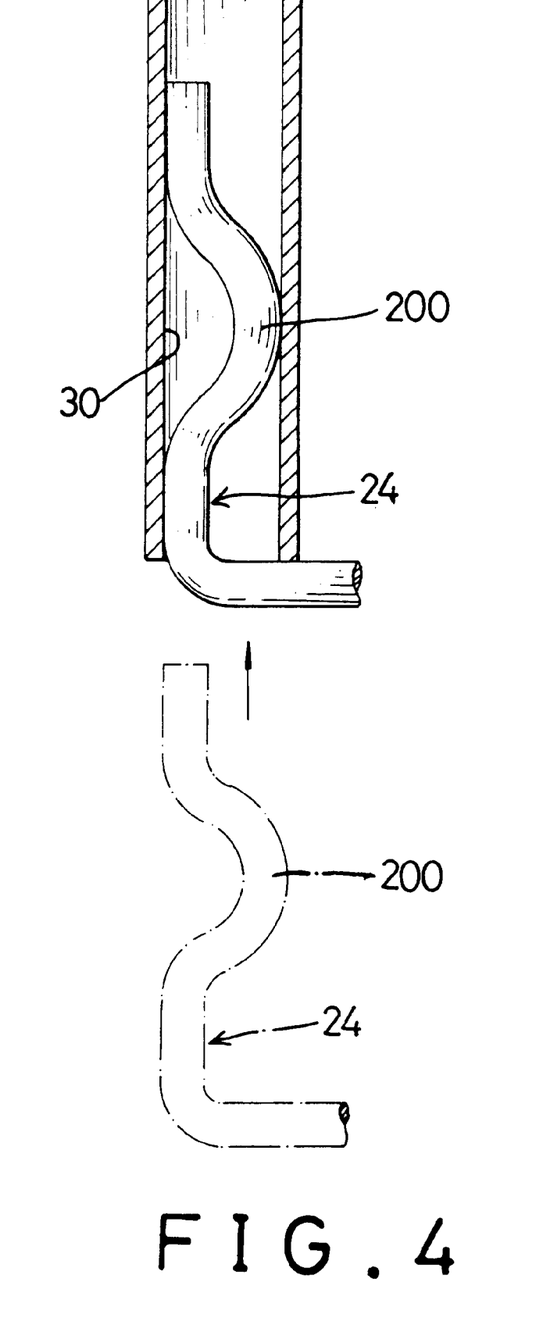
FIG. 4 is an illustrative view to show a stub is received in a hole of a member.
Figure 5:
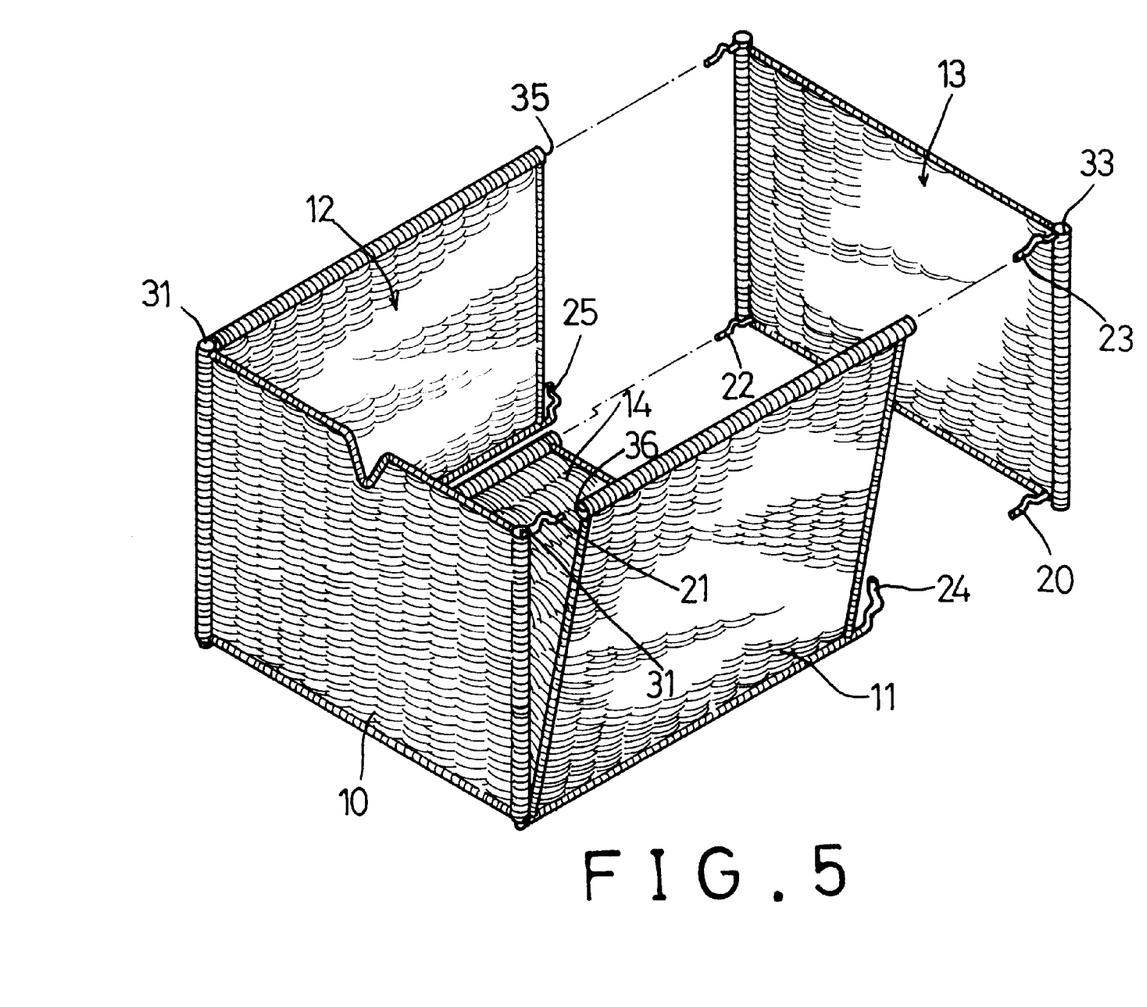
FIG. 5 is an exploded view of a second end member and the container assembly in accordance with the present invention except for the second end member.

Referring to FIG. 4, it is to be noted that each of said first stubs 20, said second stubs 21, said third stubs 22, said fourth stubs 23, said fifth stubs 24, said sixth stubs 25, and said connecting stubs 42, 43 has a curved portion 200 formed thereto. A width of each of said curved portions 200, with respect to a respective longitudinal axis of said stubs 20, 21, 22, 23, 24, 25, 42, 43 is slightly larger than an inner diameter of each of said holes 36, 37, 30, 31, 32, 33, 34, 35 of said bottom member 14, said first and said second end member 10, 13, and said first and said second side member 11, 12. Therefore, any one of the stubs 20, 21, 22, 23, 24, 25, 42, 43 is interference fitted into the corresponding hole 36/37/30/31/32/33/34/35 so as to provide the assembled container a suitable rigidity.

Figure 6:
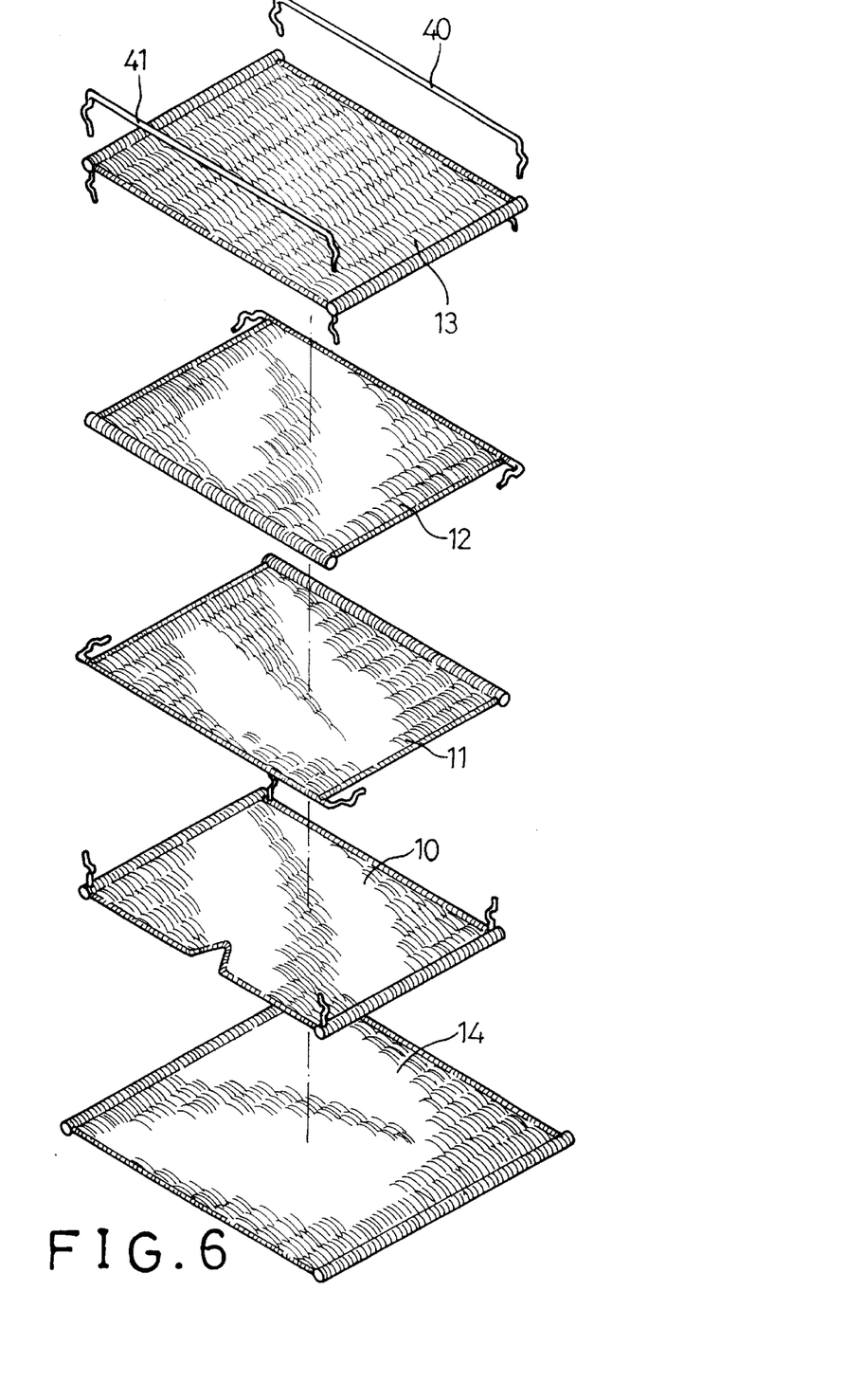
FIG. 6 is an illustrative view to show the members of the container assembly when disengaged from each other and can be overlapped.

Referring to FIG. 6, all the members 14, 10, 13, 11, 12 and two connecting members 40, 41 can be separated from each other and overlapped together so as to reduce the space they occupy when being transported from a manufacturer.

Figure 7:
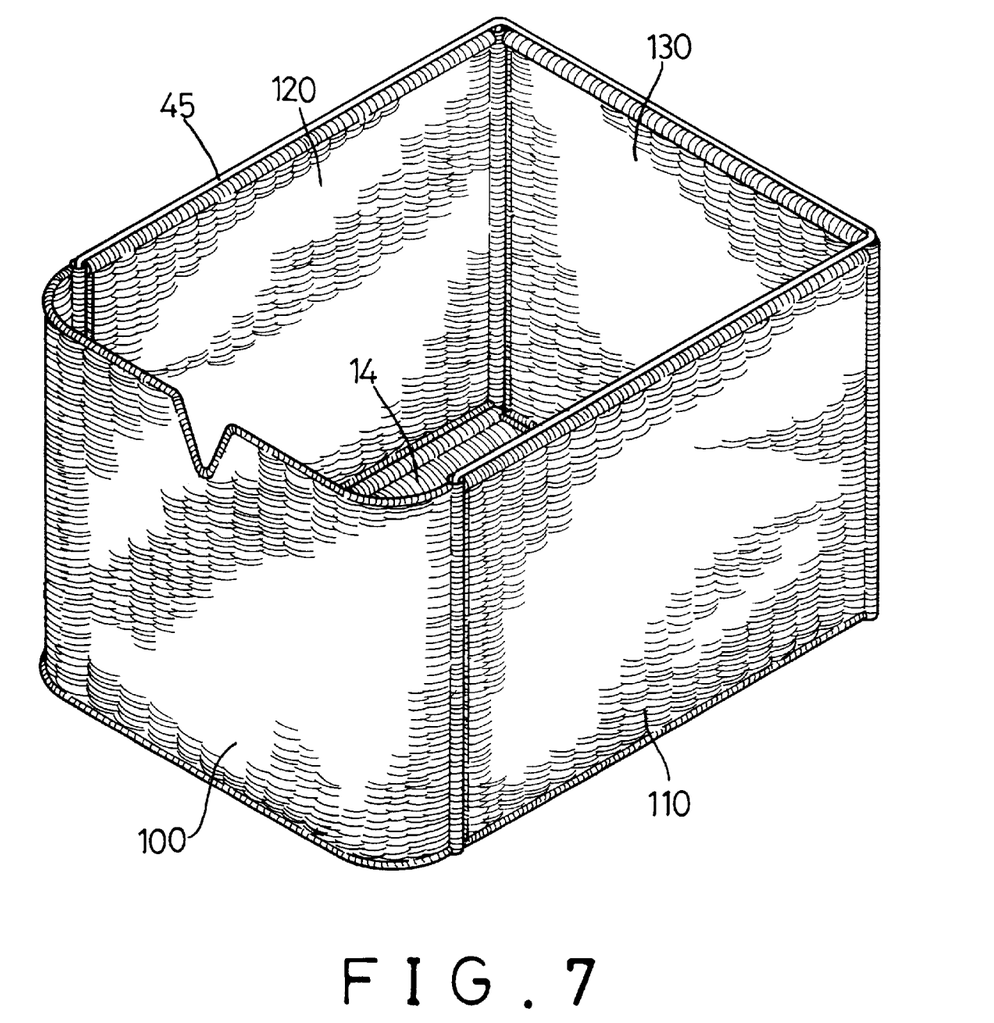
FIG. 7 is a perspective view of another embodiment of the container assembly in accordance with the present invention.
Figure 8:
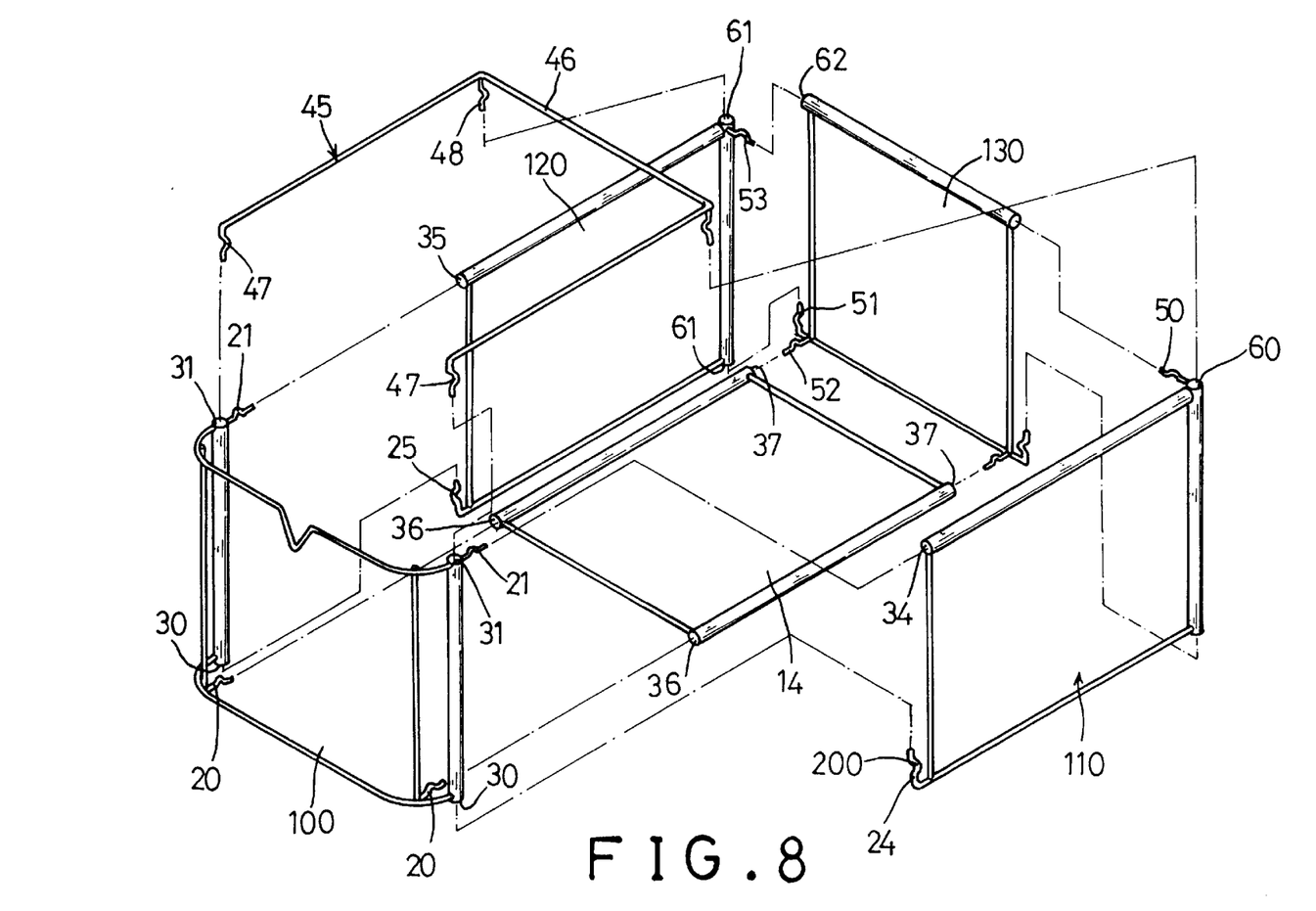
FIG. 8 is an exploded view of the container assembly shown in FIG. 7.
Figure 9:
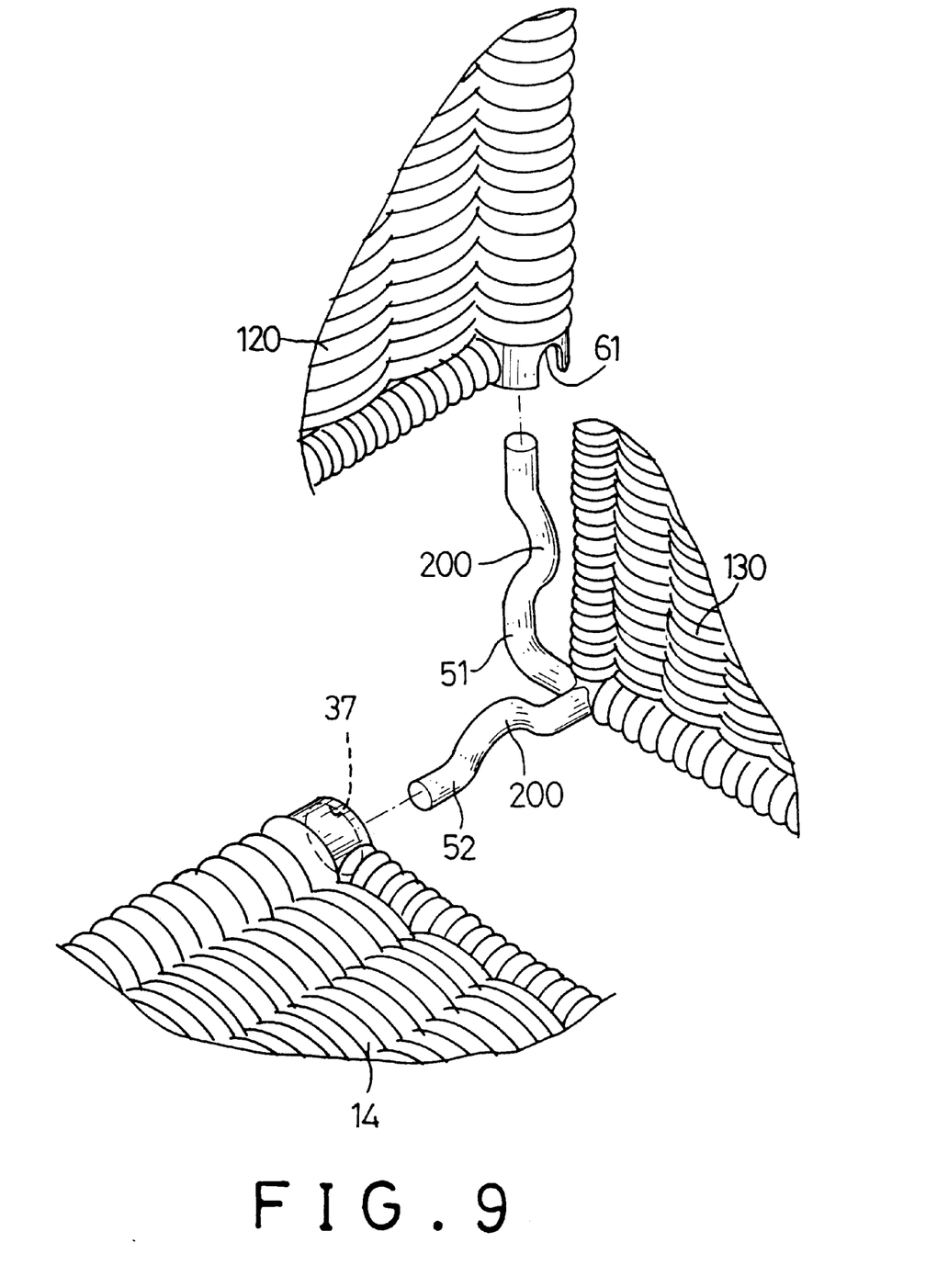
FIG. 9 is an exploded view of two members of the container assembly and shows stubs and holes which receive the stubs.

FIGS. 7–9 show another embodiment of the container assembly of the present invention which includes a bottom member 14 which has two first holes 36 defined in one of two ends thereof and two second holes 37 defined in the other end thereof.

A first end member 100 is a curved and has two third holes 30 defined in a lower end thereof and two fourth holes 31 defined in an upper end thereof. A second end member 130 has two fifth holes 62 defined in an upper end thereof. Two first stubs 20 extend laterally from said lower end of said first end member 100 so as to be inserted into said first holes 36 of said bottom member 14. Two second stubs 21 extend laterally from said upper end of said first end member 100. Two third stubs 52 extend laterally from said lower end of said second end member 130 so as to be inserted into said second holes 37 of said bottom member 14. Two fourth stubs 51 extend upwardly from said lower end of said second member 130.

A first side member 110 has a fifth stub 24 extending upwardly from a lower end thereof away from said second end member 130 so as to be inserted into one of said two third holes 30 of said first end member 100. Two sixth holes 60 are respectively defined in an upper end and said lower end thereof away from said first end member 100. The sixth hole 60 in said lower end of said first side member 110 receives one of said fourth stubs 51 of said second end member 130 and a sixth stub 50 extend laterally from said upper end of said first side member 110 so as to be received in one of said fifth holes 62 of said second end member 130. The first side member 110 has a seventh hole 34 defined longitudinally in said upper end thereof away from said second end member 130 so as to receive one of said second stubs 21 of said first end member 100. The second side member 120 has a seventh stub 25 extending upwardly from a lower end thereof away from said second end member 130 so as to be inserted into the other one of said two third holes 30 of said first end member 100. Two eighth holes 61 are respectively defined in an upper end and said lower end thereof away from said first end member 100. The eighth hole 61 in said lower end of said second side member 120 receives the other one of said fourth stubs 51 of said second end member 130. An eighth stub 53 extends laterally from said upper end of said second side member 120 so as to be received in the other one of said fifth holes 62 of said second end member 130. The second side member 120 has a ninth hole 35 defined longitudinally in said upper end thereof away from said second end member 130 so as to receive the other one of said second stubs 21 of said first end member 100.

A U-shaped connecting member includes a bottom portion 46 and two leg portions 45 respectively extending from two ends of said bottom portion 46. Each of two connecting portions where said bottom portion 46 and said two leg portions 45 are connected has a first connecting stub 48 extending downwardly therefrom so as to be respectively inserted into said sixth hole 60 and said eighth hole 61 of said first side member 110 and said second side member 120. Each of said leg portions 45 has a second connecting stub 47 extending downwardly from a free end thereof so as to be respectively inserted into said two fourth holes 31 of said first end member 100.

The first stubs 20, said second stubs 21, said third stubs 52, said fourth stubs 51, said fifth stub 24, said sixth stub 50, said seventh stub 25, said eighth stub 53, said first connecting stubs 48 and said second connecting stubs 47 each have a curved portion 200 formed thereto. A width of each of said curved portions 200, with respect to a respective longitudinal axis of each of said stubs 20, 21, 52, 51, 24, 50, 25, 53, is slightly larger than an inner diameter of each of said holes 36, 37, 30, 31, 62, 60, 34, 61, 35 of said bottom member 14, said first and said second end members 100, 130, and said first and said second side members 110, 120.

Although the invention has been explained in relation to its preferred embodiment, it is to be understood that many other possible modifications and variations can be made without departing from the spirit and scope of the invention as hereinafter claimed.

What is claimed is:

1. A container assembly comprising:

a bottom member which has two first holes defined in one of two ends thereof and two second holes defined in the other end thereof;

a first end member and a second end member, said first end member having two third holes defined in a lower end thereof and two fourth holes defined in an upper end thereof, said second end member having two fifth holes defined in a lower end thereof and two sixth holes defined in an upper end thereof, two first stubs extending laterally from said lower end of said first end member so as to be inserted into said first holes of said bottom member, two second stubs extending laterally from said upper end of said first end member, two third stubs extending laterally from said lower end of said second end member so as to be inserted into said second holes of said bottom member, two fourth stubs extending laterally from said upper end of said second member;

a first side member and a second side member, said first side member having two fifth stubs extending upwardly from a lower end thereof so as to be respectively inserted into one of said two third holes of said first end member and one of said two fifth holes of said second end member, two seventh holes respectively and longitudinally defined in an upper end of said first side member so as to respectively receive one of said two second stubs of said first end member and one of said two fourth stubs of said second end member, said second side member having two sixth stubs extending upwardly from a lower end thereof so as to be respectively inserted into the other one of said two third holes of said first end member and the other one of said two fifth holes of said second end member, two eighth holes respectively and longitudinally defined in an upper end of said second side member so as to respectively receive the other one of said two second stubs of said first end member and the other one of said two fourth stubs of said second end member, and two connecting members each having two connecting stubs extending transversely therefrom so that said two connecting stubs are inserted into said sixth holes of said second end member and said two connecting stubs are inserted into said fourth holes of said first end member.

2. The container assembly as claimed in claim 1 wherein each of said first stubs, said second stubs, said third stubs, said fourth stubs, said fifth stubs, said sixth stubs, and said connecting stubs has a curved portion formed thereto.

3. The container assembly as claimed in claim 2 wherein a width of each of said curved portions, with respect to a respective longitudinal axis of said stubs, is slightly larger than an inner diameter of each of said holes of said bottom member, said first and said second end member, and said first and said second side member.

4. A container assembly comprising:

a bottom member which has two first holes defined in one of two ends thereof and two second holes defined in the other end thereof;

a first end member and a second end member, said first end member having two third holes defined in a lower end thereof and two fourth holes defined in an upper end thereof, said second end member having two fifth holes defined in an upper end thereof, two first stubs extending laterally from said lower end of said first end member so as to be inserted into said first holes of said bottom member, two second stubs extending laterally from said upper end of said first end member, two third stubs extending laterally from said lower end of said second end member so as to be inserted into said second holes of said bottom member, two fourth stubs extending upwardly from said lower end of said second member;

a first side member and a second side member, said first side member having a fifth stub extending upwardly from a lower end thereof away from said second end member so as to be inserted into one of said two third holes of said first end member, two sixth holes respectively defined in an upper end and said lower end thereof, away from said first end member, said sixth hole in said lower end of said first side member receiving one of said fourth stubs of said second end member, a sixth stub extending laterally from said upper end of said first side member so as to be received in one of said fifth holes of said second end member, said first side member having a seventh hole defined longitudinally in said upper end thereof away from said second end member so as to receive one of said second stubs of said first end member, said second side member having a seventh stub extending upwardly from a lower end thereof away from said second end member so as to be inserted into the other one of said two third holes of said first end member, two eighth holes respectively defined in an upper end and said lower end thereof, away from said first end member, said eighth hole in said lower end of said second side member receiving the other one of said fourth stubs of said second end member, an eighth stub extending laterally from said upper end of said second side member so as to be received in the other one of said fifth holes of said second end member, said second side member having a ninth hole defined longitudinally in said upper end thereof away from said second end member so as to receive the other one of said second stubs of said first end member, and a U-shaped connecting member including a bottom portion and two leg portions extending from two ends of said bottom portion, each of two connecting portions where said bottom portion and said two leg portions are connected having a first connecting stub extending downwardly therefrom so as to be respectively inserted into said sixth hole and said eighth hole of said first side member and said second side member, each of said leg portions having a second connecting stub extending downwardly from a free end thereof so as to be respectively inserted into said two fourth holes of said first end member.

5. The container assembly as claimed in claim 4 wherein said first stubs, said second stubs, said third stubs, said fourth stubs, said fifth stub, said sixth stub, said seventh stub, said eighth stub, said first connecting stubs and said second connecting stubs each have a curved portion formed thereto.

6. The container assembly as claimed in claim 5 wherein a width of each of said curved portions, with respect to a respective longitudinal axis of each of said stubs, is slightly larger than an inner diameter of each of said holes of said bottom member, said first and said second end members, and said first and said second side members.

* * * * *